Patented Dec. 7, 1943

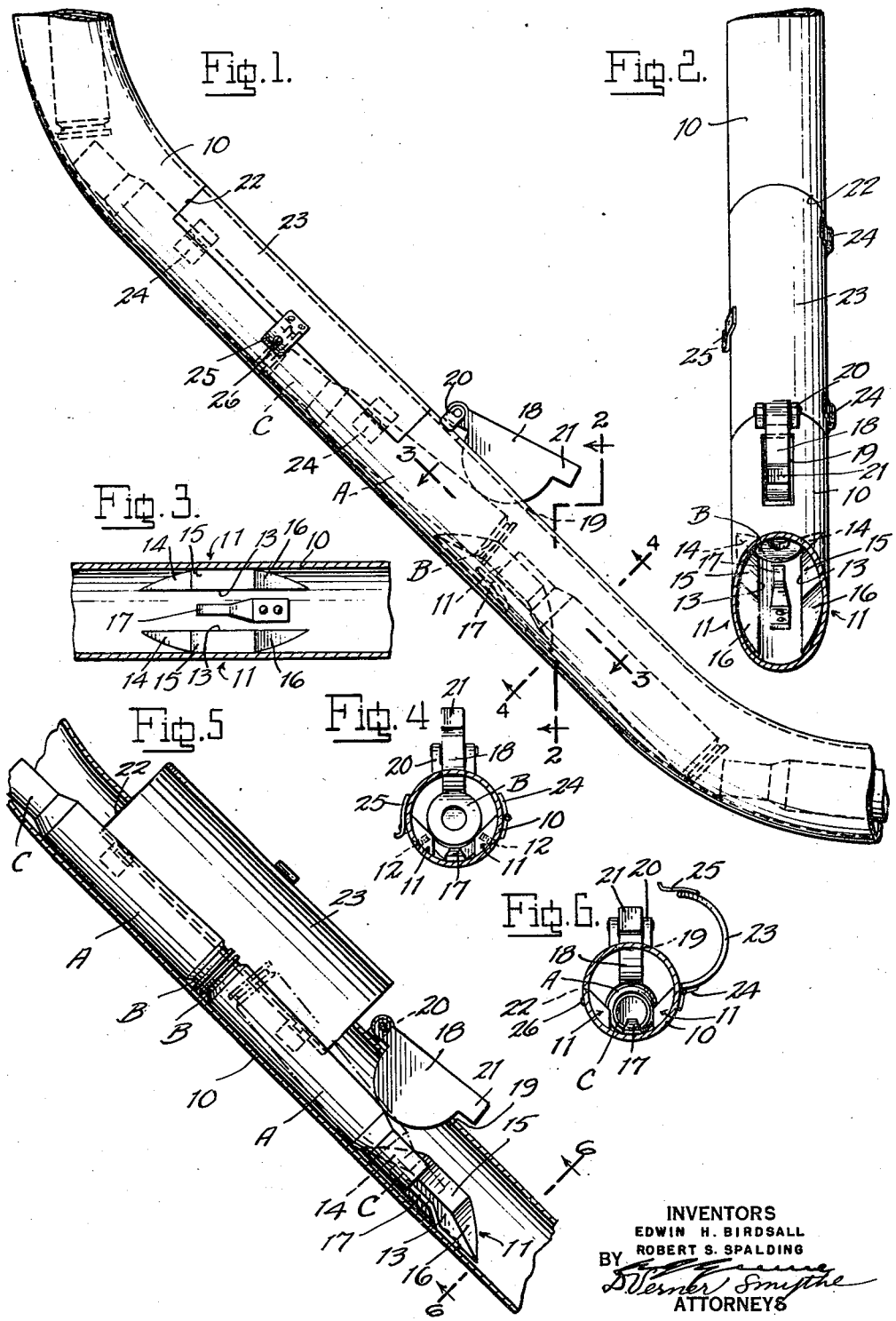

2,336,059

UNITED STATES PATENT OFFICE 2,336,059

ARTICLE ALIGNING DEVICE

Edwin H. Birdsall, Golden, and Robert S. Spalding, Denver, Colo., assignors to Remington Arms Company, Inc., Bridgeport, Conn., a corporation of Delaware Application December 18, 1942, Serial No. 469,435

5 Claims. (Cl. 193—40)

The present invention relates to article feeding mechanism, and while the principles of the invention are adapted for the feeding of any suitable type of hollow article, as will be obvious from the description, the illustrated disclosure is particularly directed to the feeding of cartridge cases from a hopper or other source of supply to a machine for performing an operation upon the case, such as trimming its contracted mouth end.

In the case of the trimming operation upon the mouth end of cartridge cases, the cartridge cases are normally fed from a hopper to a tube which conducts them into holding fingers of the trimming machine, which in turn move them into operative relation with a revolving trimming tool. This mouth end is of different shape and smaller diameter than the head end of the cartridge case, and the metal is relatively softer, so that the holding fingers, designed to grip the head end, and the trimming tool, designed to trim the mouth end, are incapable of handling an inverted case, the shape, thickness, and metal hardness of the head end being such that unintended engagement of the trimming tool therewith ruins the tool and strains the tool holder. While devices are associated with the hopper for arranging the cases for delivery in proper position, a case will occasionally enter the tube in an inverted position. It may occur that the presentation of an inverted cartridge case to the trimming machine may not cause such noticeable damage that it will immediately be brought to the attention of the operator, but any slight damage to the tool or strain upon the tool holder which may be caused by such unintended engagement will result in the production of a continuous stream of sub-standard cartridge cases which will automatically be delivered to and mixed with perfect or standard cases, and this will continue until noted and corrected. Heretofore, if the inverted case was observed, as it was fed into the trimming machine and engaged by the tool, the machine could be stopped and the damaged tool replaced immediately, but this required constant observation of the machine, depended upon the alertness and integrity of the operator, and furthermore did not prevent tool damage. While such inverted feeding of cases to the trimming machine is infrequent, the damage and production loss that may result therefrom is considerable and costly.

It is an object of the invention to provide a feeding mechanism, which will prevent the feed to a trimming machine or the like of cartridge cases or the like disposed in an inverted position, that is with the mouth end forward instead of in the correct position with the head end forward, to the end that there is no possibility of an inverted case coming into operative relation with the machine, and consequently the possibility of damage to the machine from inverted cases and delay in production is eliminated.

It is a further object to provide a feeding mechanism which will permit the uninterrupted feeding of a succession of properly positioned cartridge cases, but will automatically stop the feeding of an inverted case before it can reach the trimming machine, at the same time stopping the flow of the following cartridge cases in the feed line and requiring the removal of the inverted case before resumption of the normal feed.

With the above and other objects in view, an embodiment of the invention is shown in the accompanying drawing, and this embodiment will be hereinafter more fully described with reference thereto, and the invention will be finally pointed out in the claims.

In the drawing:

Fig. 1 is a side elevation of the article feeding mechanism for feeding cartridge cases, according to the illustrated exemplary embodiment of the invention.

Fig. 2 is a front elevation, the feed tube being shown in vertical section taken along the line 2—2 of Fig. 1.

Fig. 3 is a longitudinal lateral sectional view of the feed tube, taken along the line 3—3 of Fig. 1.

Fig. 4 is a transverse sectional view, taken along the line 4—4 of Fig. 1, and showing the position of a cartridge case in normal head-forward feeding position.

Fig. 5 is a longitudinal vertical sectional view of the article feeding mechanism, and showing a cartridge case in improper inverted position and impaled upon the stop means.

Fig. 6 is a transverse sectional view, taken along the line 6—6 of Fig. 5.

Similar reference characters indicate corresponding parts throughout the several figures of the drawing.

Referring to the drawing, the article feeding mechanism, according to the illustrated exemplary embodiment of the invention, is incorporated in the article feed tube 10 along a straight portion of its inclined gravity-feed section disposed between the hopper or other suitable article-supplying means, connected at the upper mouth end of the tube, and the trimming or other suitable machine, connected at the lower outlet end of the tube, for operating individually upon the successively fed articles. The upper end of the inclined section of the tube is preferably curved in a wide radius to an upper vertical section, while the lower end is curved in a wide radius to a lower horizontal section, the arrangement being such that the cartridge cases or other articles are fed vertically into the tube, flow by gravity therethrough in single file end-to-end relation, and are presented horizontally and head end forward to the holding fingers of the trimming machine.

It should be pointed out that in carrying out the principle of the present invention advantage is taken of the differences in structure and size between the two ends of the article being fed. In the case of the cartridge case A the closed head end B, which it is desired to dispose forward during the feeding is of relatively large diameter and is externally grooved, while the bullet receiving open mouth end C, which it is desired to dispose rearwardly during the feeding operation, so that it is brought into proper cooperative position with the trimming tool, is necked and of relatively smaller diameter. Furthermore, it is the difference in structure and size of the two ends of the article that make it necessary to feed the article in its proper position in relation to the trimming or other tool of the machine for operating upon the article, as damage to the machine, which it is the purpose of the present invention to eliminate, is caused through the engagement of the tool with a shape, metal structure, and size for which it is not designed.

Within the tube 10 at an intermediate point between the ends of the straight portion of the inclined section, which portion may for instance be equal to the combined length of at least two of the components being fed, there are provided upon the lower side of the tube a pair of transversely spaced ramp members 11—11, rigidly secured by means of screws 12, and each including a straight vertical longitudinal inner face 13, a rising ramp portion 14 at the upper end, an intermediate longitudinal raised portion 15 parallel to the axis of the tube, and a down ramp portion 16 at the lower end.

The opposed surfaces 13—13 of the ramp members are spaced a predetermined distance apart, calculated in connection with the diameters of the ends of the article being fed, and the surfaces 14, 15, and 16 are preferably inclined upwardly and outwardly from the space between the two ramp members to the surface of the tube, to provide a trough-like guide to direct the articles passing in relation to the ramp into substantially centralized relation in the tube. The spacing of the two ramp members is such that the large head end B of the cartridge case, if disposed in its normal forward position, will not drop down into the space between the ramp members but will ride up the rising portions 14 to the intermediate raised portions 15, and thus pass freely over the ramp, while the mouth end C of an inverted cartridge case will pass between the rising portions 14 into the space between the ramp members. In this latter case the mouth end C is impaled upon an upwardly directed hook member 17 secured to the tube between the ramp members, and having its upwardly projecting impaling end downwardly spaced from the intermediate raised portions 15, so that the head end B of the cartridge cases passing thereover will be clear of the hook member, and upwardly spaced from the base of the tube, so that it will enter the mouth end C of an inverted cartridge case as the latter moves between the rising ramp portions 14—14, as shown clearly in Figs. 5 and 6.

In order to insure proper movement of the cartridge cases into relation with the ramp and impaling hook a weight member 18 is engaged through a slot 19 in the upper side of the tube slightly in advance of the ramp, so as to engage and press the cartridge cases downwardly into firm engagement with the base of the tube as they come into relation with the ramp, this weight member being pivotally mounted at its upper end upon a supporting bracket 20 secured to the upper side of the tube and being limited in its engaging movement through the slot 19 by engagement of a lower projecting lip end 21 thereof with the upper surface of the tube adjacent the lower end of the slot. The article engaging surface of the weight member is suitably curved, so that it will not interfere with the gravity flow of the articles through the tube.

In upwardly spaced relation from the weight member the tube is provided with an opening 22 of suitable width and length and so disposed with relation to the impaling hook that an impaled inverted cartridge case will have its head end disposed in the opening and can be conveniently removed from the tube by the operator of the machine. The opening is normally closed by a transversely curved door 23 having its inner surface corresponding to the inner cylindrical surface of the tube, being mounted on hinges 24—24 at one side and provided at its other side with a spring catch 25 adapted to snap into engagement with a suitable catch button 26 secured to the tube.

In operation, the succession of end-to-end cartridge cases goes through the tube 10 in uninterrupted flight as long as the cases are disposed in their proper position with the head end down, as shown in Fig. 1, the cases being engaged by the weight member 18, as they move into relation with the ramp members and impaling hook, and riding freely over the ramp clear of the impaling hook by virtue of the relatively large diameter of the head end spanning the space between the ramp members out of contact with the impaling hook. In the event that an inverted case is fed into the tube from the hopper, it comes into contact with the weight member 18 as it approaches the ramp members and impaling hook, so that the case is held against the lower side of the tube with its open mouth end directly in line with the impaling hook member. As the relatively small diameter of the mouth end is less than the width of the space between the ramp members the mouth end enters between the ramp members and is engaged by the impaling hook, the case being thereupon tilted, as the shoulder of the cartridge case comes into contact with the opposed edges of the rising ramp portions 14—14, to raise the head end upwardly from the lower side of the tube, as shown in dot-and-dash lines in Fig. 5. The impaling of this inverted case stops the flow of cartridge cases to the trimming machine, which then continues to operate without any cases being fed to it, the operator whose attention is thus called to the machine thereupon opening the door of the opening 22 and removing the impaled case therethrough. As soon as this inverted case is removed the flow of the cases will resume and continue uninterruptedly until stopped by the impaling of another inverted case.

The form of the invention illustrated in the drawing and described herein is typical and illustrative only, and it is evident that the invention is capable of embodiments in other forms, all falling within the scope of the appended claims, which are to be broadly construed.

What is claimed is:

1. In a feed device, for articles having one end open and the other end of different structural form, an article conveying means adapted to receive and convey said articles in successive end-to-end relation, article entering means mounted on said conveying means disposed in the path of the open ends of said articles, whereby the feed of an inverted open-end-forward article is interrupted by said article entering means, and ramp means constituting a bridging guide adjacent to said article entering means engageable by said other ends of said articles in their normal open-end-rearward position to move the end opposite from the open end away from the article entering means.

2. In a feed device, for articles having one end open and the other end of larger diameter than said open end, an article conveying means adapted to receive and convey said articles in successive end-to-end relation, article entering means associated with said conveying means disposed in the path of the open ends of said articles, whereby the feed of an inverted open-end-forward article is interrupted by said article entering means, and ramp means spaced at each side of said article entering means a greater distance apart than the diameter of the open ends of said articles and a less distance than the diameter of the other ends constituting a bridging guide with respect to said article entering means engageable by said other ends of said articles in their normal open-end-rearward position.

3. In a feed device, for articles having one end open and the other end of larger diameter, an inclined gravity feed article conveying tube means adapted to receive and convey said articles in successive end-to-end relation, article entering means mounted in the lower side of said conveying tube means disposed in the path of the open ends of said articles, whereby the feed of an inverted open-end-forward article is interrupted by said article entering means, and diverting means associated with and adjacent to said article entering means engageable by the larger diameter end of said articles in their normal open-end-rearward position, and arranged to guide said articles away from and past said article entering means.

4. In a feed device, for articles having one end open and the other end of different structural form, an inclined gravity feed article conveying tube means adapted to receive and convey said articles in successive end-to-end relation, article entering means mounted in the lower side of said conveying tube means disposed in the path of the open ends of said articles, whereby the feed of an inverted open-end-forward article is interrupted by said article entering means, diverting means associated with said article entering means engageable by said other ends of said articles in their normal open-end-rearward position, and arranged to guide said articles past said article entering means, and weight means in the upper side of said tube engageable with said articles to press them against the lower side.

5. In a feed device, for articles having one end open and the other end of larger diameter, an inclined gravity feed article conveying tube means adapted to receive and convey said articles in successive end-to-end relation, article entering means mounted in the lower side of said conveying tube means disposed in the path of the open ends of said articles, whereby the feed of an inverted open-end-forward article is interrupted by said article entering means, and diverting means associated with and mounted adjacent to said article entering means engageable by said other ends of said articles in their normal open-end-rearward position, and arranged to guide said articles away from and past said article entering means, said conveying tube having an opening contiguous to said article entering means for the removal of articles interrupted thereby.

EDWIN H. BIRDSALL.
ROBERT S. SPALDING.